US006323251B1

(12) United States Patent
Perez et al.

(10) Patent No.: US 6,323,251 B1
(45) Date of Patent: Nov. 27, 2001

(54) THERMOPLASTIC/THERMOSET HYBRID FOAMS AND METHODS FOR MAKING SAME

(76) Inventors: Mario Alberto Perez; Robert Dennis Waid; John Ekrem Gozum; Cheryl Lee Senger Elsbernd; Mark David Gehlsen, all of P.O. Box 33427, St. Paul, MN (US) 55133-3427

( * ) Notice: Subject to any disclaimer, the term of this patent is extended or adjusted under 35 U.S.C. 154(b) by 0 days.

(21) Appl. No.: 09/405,531

(22) Filed: Sep. 24, 1999

(51) Int. Cl.[7] ........................................ C08J 9/00
(52) U.S. Cl. .................... 521/134; 521/135; 521/139; 521/76; 521/81; 521/137; 521/138; 522/129; 522/131; 428/343
(58) Field of Search ........................... 522/129, 131; 521/88, 134, 139, 135, 76, 81, 137, 138; 428/343

(56) References Cited

U.S. PATENT DOCUMENTS

| 3,923,922 | | 12/1975 | Grant ........................... 260/2.5 |
| 4,542,164 | * | 9/1985 | Nishioka et al. ............... 521/135 |
| 5,074,209 | | 12/1991 | Prittie ........................... 101/395 |
| 5,158,986 | | 10/1992 | Cha et al. ...................... 521/82 |
| 5,271,612 | | 12/1993 | Yada et al. .................... 267/158 |
| 5,274,006 | * | 12/1993 | Kagoshima et al. ............ 521/85 |
| 5,275,102 | | 1/1994 | Prittie ........................... 101/395 |
| 5,304,580 | | 4/1994 | Shibayama et al. ............ 521/150 |
| 5,352,507 | * | 10/1994 | Bresson et al. ................ 428/245 |
| 5,369,135 | * | 11/1994 | Campbell et al. .............. 521/134 |
| 5,709,948 | * | 1/1998 | Perez et al. .................... 428/413 |
| 5,883,143 | | 3/1999 | Eiben et al. ................... 521/130 |
| 5,939,464 | * | 8/1999 | Wang ........................... 521/139 |
| 6,045,953 | * | 4/2000 | Ohe et al. ...................... 430/1 |

FOREIGN PATENT DOCUMENTS

| 1704647 | 5/1971 | (DE) . |
| 2352969 | 4/1975 | (DE) . |
| 2054410 | 2/1981 | (GB) . |
| 93117501 | 5/1993 | (JP) . |
| 7070520 | 3/1995 | (JP) . |
| 95207057 | 8/1995 | (JP) . |
| 97111030 | 4/1997 | (JP) . |
| WO 98/52997 | 11/1998 | (WO) . |

OTHER PUBLICATIONS

Supercritical CO2 extrusion opens new product opportunities, Food Engineering, 71, 6, 29 (2), Jun. 1999.

* cited by examiner

Primary Examiner—James J. Seidleck
Assistant Examiner—Melanie D. Bagwell
(74) Attorney, Agent, or Firm—Kimberly S. Zillig

(57) ABSTRACT

Foams comprising blends of thermoplastic and thermoset materials wherein the thermoset forms a discontinuous phase in a continuous thermoplastic phase are described. Foams comprising an uncured thermoset and unreacted radiation-activatable curing agent in a thermoplastic matrix are also described. Additionally described are batch and continuous methods for making the foams. Particular uses for the foams, such as flexographic mounting tapes, are also described.

30 Claims, 3 Drawing Sheets

THERMOPLASTIC/THERMOSET HYBRID FOAMS AND METHODS FOR MAKING SAME

TECHNICAL FIELD

This invention relates to foams and foam articles comprising a discontinuous thermoset phase in a thermoplastic matrix.

BACKGROUND

Foamed polymeric materials have found use in many industrial applications. Foams are generally made of either thermoplastic or thermoset materials. Polyurethane foams comprise the most widely-known thermosetting polymer foams. Typically, thermoset foams are cured as foam formation occurs, and no post-foaming cure is possible or necessary. The largest industrial volumes of thermoplastic polymer foams include polystyrene and polyethylene foam.

Foamed structures have been prepared using both chemical and physical blowing agents. Chemical blowing agents are materials that decompose, typically upon heating, to produce a gas. The formation of gas bubbles within a polymer matrix produces a polymer foam. Physical blowing agents are materials that are typically gases at ambient temperature and pressure, which are mixed with a polymer to form a foam. Physical blowing agents are typically used in a foaming process in a liquid or supercritical form under high pressure. Liquid or supercritical carbon dioxide is an example of a physical blowing agent. Upon an increase in temperature or reduction in pressure, the blowing agent expands, producing foam in the polymer matrix in which it is mixed.

Foam tapes comprise an important industrial segment. Typical constructions include a foam layer that may have a backing layer and, on an opposite side, an adhesive layer, such as a pressure-sensitive adhesive layer. Alternatively, an adhesive layer may be coated on both sides of a foam layer to make, e.g., a mounting tape. Such a tape may be stiff or compliant, thick or thin, depending on the nature of the foam.

SUMMARY OF INVENTION

The present invention relates to thermoplastic foams with incorporated thermosettable materials and to the foams that result from curing the thermosettable materials. Foams of the invention can be prepared using a blowing agent that can be a swelling agent and plasticizer for the thermoplastic polymer matrix and can be a solvent that allows the thermosettable material to be introduced into the thermoplastic matrix.

The foams of the present invention can be made to possess useful characteristics such as variable modulus. This allows, for example, the ability to increase the modulus or stiffness of foam mounting tape in a specified pattern, such as, e.g., through image-wise curing of the polymer foam. This ability would constitute a distinct use advantage. The foams can also be made to provide encapsulated materials in the foam cells. This type of foam could be used to isolate reactive materials, which could be brought into contact, upon demand, by rupturing the foam cells. The method of the present invention enables the making of a thermoplastic foam comprising up to 45 weight % thermoset material.

One aspect of the invention features a foam comprising a discontinuous phase of at least one cationically-curable thermoset material in a continuous phase of at least one thermoplastic material. In another aspect, the foam further comprises at least one unactivated radiation-activatable curing agent for the thermoset material. The thermoset material may subsequently be partially or totally cured. It may also be selectively cured, for example, when used as a flexographic mounting tape. The thermoset material may be contained within the foam cells or may be entrained in the thermoplastic material. The thermoset material may comprise about 1 weight % to 45 weight % of the combined weight of the thermoplastic and thermoset materials.

Another aspect of the invention features articles comprising the foam material of the invention. The articles may include a flexographic printing plate construction or flexographic mounting tape. At least one surface of an article comprising the foam of the invention may also be covered with a coating such as a pressure sensitive adhesive. The article may also comprise a thermoplastic matrix encapsulating pockets of thermoset material.

Another aspect of the invention features a method for making a hybrid thermoplastic/thermoset film by mixing at least one thermoplastic material with at least one cationically curable thermoset material and at least one blowing agent at a temperature and pressure sufficient to form and maintain a uniformly dispersed mixture such that the thermoset forms a discontinuous phase in a continuous thermoplastic phase, shaping the mixture, and exposing the mixture to a reduced pressure to cause nucleation and cell formation. The blowing agent may be chemical or physical and the method may be performed as a batch or continuous process. Surfactants and stabilizers may also be added.

As used in this invention:

"thermoplastic/thermoset" means a material containing both thermoplastic and thermoset materials;

"supercritical fluid" means a substance, which is typically a gas at ambient temperature and pressure, compressed to a state where it has the density and solvation characteristics of a liquid, but the viscosity, permeability, and diffusivity of a gas; a supercritical fluid is a single phase material that exists above a critical point, which point is determined by a critical temperature, $T_c$, and critical pressure, $P_c$, which $T_c$ and $P_c$ depend on the particular gas (for example, the $T_c$ and $P_c$ for carbon dioxide are approximately 31° C. and 7.4 MPa (1078 psia), respectively);

"foam density" means the weight of a given volume of foam;

"polymer matrix" means the polymeric, or "non-cell," areas of a foam; it includes the continuous thermoplastic phase and any thermoset material entrained in the thermoplastic material;

"functional group" means an atom or group of atoms, acting as a unit, that has replaced a hydrogen atom in a hydrocarbon molecule and whose presence imparts characteristic properties to the molecule;

"thermoset" and "thermosettable material" are used interchangeably and mean a material that solidifies irreversibly, due to crosslinking, when heated or subjected to irradiation;

"hybrid" means having two or more different characteristics or types of structures, e. g., a thermoplastic/thermoset material;

"cationically curable monomer" means a monomer capable of polymerization when exposed to a cationic moiety;

"polymerizable composition" or "curable composition" as used herein means a mixture of an initiator system and a cationically curable monomer; alcohols and adjuvants optionally can be present;

"cure" and "polymerize" are used interchangeably and mean to supply sufficient energy to a composition in the form of actinic radiation (e.g, heat, light) or electron beam in any order or combination to alter the physical state of the composition, to make it transform from a fluid to less fluid state, to go from a tacky to a non-tacky state, to go from a soluble to insoluble state, or to decrease the amount of polymerizable material by its consumption in a chemical reaction; and "variable modulus" means exhibiting non-uniform compression modulus over a described surface area and/or through the cross section of a material, e.g., between two major parallel surfaces, typically induced by patterned thermoset cure.

An advantage of at least one embodiment of a polymeric foam of the present invention is the presence of fully or partially cured and uncured segments in the same article, providing variable modulus properties. The modulus may vary in a vertical and/or horizontal direction through a given section of foam. The modulus variation through a section of foam may have a gradient or may have distinct transitions. These properties can be employed advantageously in many applications, including flexographic printing.

An advantage of at least one embodiment of the present invention is the increased amount of thermoset monomer that can be introduced into a thermoplastic matrix. This allows the thermoplastic foam to have some of the favorable properties of the thermoset material, such as reinforcing properties. At least one aspect of the present invention can allow for the incorporation of as much as 45 weight % thermoset in a thermoplastic/thermoset foam system. One means of accomplishing this high thermoset weight % is using $CO_2$ as a blowing agent, preferably in a liquid or supercritical fluid form. Thermosetting monomers tend to be more miscible in $CO_2$ than are thermoplastic materials. This allows the creation of thermoset-rich domains in which the $CO_2$ is concentrated. After the $CO_2$ escapes during the foaming process, the thermoset material may be partitioned between both the cell formed by the expanding $CO_2$ and the thermoplastic matrix.

An advantage of at least one embodiment of the present invention is that the thermoset monomers may be crosslinked before or after void (cell) formation, as long as crosslinking does not interfere with further steps in processing the desired article. Crosslinking can alter the mechanical properties of the foamed structure, e.g., compressive, tensile, and damping properties.

An advantage of at least one embodiment of the present invention is that the surface properties of the resulting foamed structure may be tailorable and may be controlled by process conditions or by the thermoset materials used. For example, the surfaces of thermoplastic foam articles may be made more compatible with adhesive coatings by inclusion in the foam material of, e.g., epoxy resins, which are more polar and may be more wettable than thermoplastic materials.

An advantage of at least one embodiment of the present invention is that it provides a new encapsulation technique. Encapsulation can be used to isolate a reactive material until activation is desired. This can allow, e.g., for cure on demand structural epoxies, selective triggering of adhesives, safe handling of potentially hazardous reactants, and pressure sensitive adhesive (PSA)/structural hybrid adhesives.

DETAILED DESCRIPTION

Foam Material and Article

Figure 1:
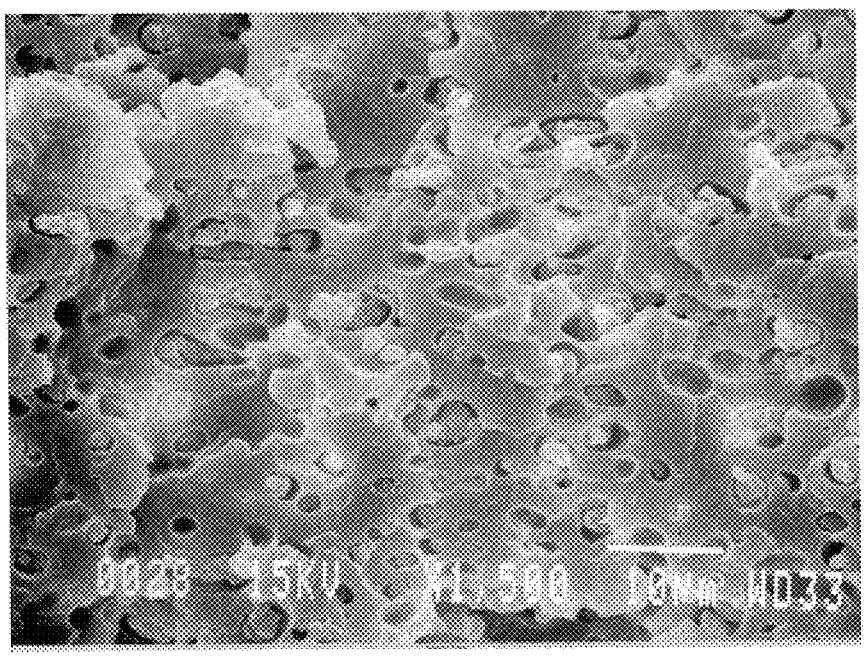
FIGS. 1 and 2 show scanning electron microscope (SEM) digital image micrograph of a cross section of a polypropylene/epoxy film of the present invention, made by a batch process, at magnifications of 1,500× and 5,000×, respectively.

One aspect of the invention provides a foam comprising a discontinuous phase of thermoset material in a continuous phase, or matrix, of thermoplastic material. The foams of the invention comprise more than 50 weight % thermoplastic material. The thermoset material may be inside the cells (voids) of the foam or directly in the thermoplastic matrix. The thermoplastic material and entrained thermoset material form the polymer matrix of the foam.

The foam may be made using a matrix material that can flow at storage temperature over time (i.e., a material having time- and temperature-dependent flow properties). This ability to flow can cause the foam cell structures to collapse thereby producing a material having pockets of thermoset monomer encapsulated in a thermoplastic matrix. These properties may be employed advantageously to encapsulate materials into the thermoplastic matrix. A material that is miscible with the thermoset material and blowing agent can be deposited in the foam cells.

Pursuant to the present invention a thermoplastic article comprising from 1 to as much as 45 weight % thermoset may be made; preferably 3 to 45 weight %; more preferably 10 to 25 weight %. This allows the properties of a thermoset, such as high compressive strength to be imparted to the thermoplastic article. Additionally, a thermoplastic and thermoset composite material in the form of a foam wherein the thermoset is cured can provide a light weight material having a compressive strength comparable to a thermoplastic and thermoset film material. This can be seen in Table 4 by comparing the compressive strength of a thermoplastic foam comprising 18 wt % of a cured thermoset to a solid vinyl tape.

The foams of the invention typically have cell sizes in the range of about 1 to 200 micrometers. The void volumes of the foams are typically at least 5% with corresponding density reductions.

When the foam material is used to make an article, the thermoset material may be uncured, partially cured, or fully cured, or a combination of any of these states. Alternatively, it may be selectively cured, i.e., image-wise cured. Image-wise curing can be accomplished by using a photographic negative or mask in negative shapes of particular desired images to prevent areas under the negative or mask from being cured (or to cause it to be cured to a lesser degree than other areas) when the foam is irradiated. Foams of the present invention may also have different levels of cure vertically through a cross section. The level of cure may change abruptly or may gradually change over a given distance. In summary, the level of cure can vary in a horizontal and/or vertical direction through the foam. If the foam is to remain uncured, no curing agent is necessary. If the foam is to be cured to any degree, a radiation-activatable curing agent for the thermoset material is preferably included.

Adding a thermoset material, such as an epoxy to a thermoplastic foam can impart the higher surface energy of the thermoset to the surface of a thermoplastic, e.g., polyolefin, foam article. This increased surface energy can provide increased compatibility with adhesives coated on the article.

The method of the present invention provides a fully formed foam, i.e., cells have stopped growing, that contains an unactivated curing agent for the thermoset material.

Method of Making

The foams of the present invention may be made in batch and continuous processes. The mixing processes may employ chemical or physical blowing agents. No carrier fluid is required for the thermoplastic, thermoset, curing agent, or blowing agent.

Typically, thermoset materials are substantially immiscible with thermoplastic materials. This immiscibility inhibits the formation of thermoplastic/thermoset hybrid materials having a thermoset content greater than about 10 or 15 weight %. To overcome this limitation, the present invention uses a blowing agent that swells the thermoplastic material and in which the thermoset material is soluble. This allows a higher weight % of thermoset material to be introduced into the thermoplastic matrix of the foam. For example, by using carbon dioxide as a blowing agent, a foam comprising from 1 to 45 weight %, preferably 3 to 45 weight %, more preferably 10 to 25 weight % thermoset material may be made. If the thermoplastic and thermoset materials used in the present invention are highly immiscible, it is believed that the thermoset will more readily migrate to domains rich in blowing agent, which domains eventually form the foam voids. Accordingly, in such a case it is expected that most of the thermoset material will be deposited inside the foam voids rather than entrained in the thermoplastic material.

In addition to using a blowing agent that is a plasticizer for the thermoplastic and a solvent for the thermoset, a number of processing parameters can be manipulated to affect the amount of thermoset material that can be incorporated into the thermoplastic material. For example, use of a co-rotating twin-screw extruder equipped with a high-intensity mixing screw was found to increase the amount of incorporated thermoset. The blowing agent can also be introduced into the thermoplastic under pressure. In general, the higher the pressure, the more blowing agent that can be incorporated into the thermoplastic material. Likewise, introducing blowing agent (e.g., $CO_2$) before introducing the thermoset, and using a compatibilizing agent suitable for the thermoplastic-thermoset pair can increase the amount of incorporated thermoset Compatibilizing agents useful in the invention, and which are added to the thermoplastic phase, can include functionalized polyolefins, i.e., polyolefins that have additional chemical functionality, obtained through either copolymerization of olefin monomer with a functional monomer or graft copolymerization subsequent to olefin polymerization. Typically, such functionalized groups can include O, N, S, P, or halogen heteroatoms. Such reactive functionalized groups can include carboxylic acid, hydroxyl, amide, nitrile, carboxylic acid anhydride, or halogen groups. Many functionalized polyolefins are available commercially. For example, copolymerized materials include ethylene-vinyl acetate copolymers, such as the ELVAX series, commercially available from DuPont Chemicals, Wilmington, Del., the ELVAMIDE series of ethylene-polyamide copolymers, also available from DuPont, and ABCITE 1060WH, a polyethylene-based copolymer comprising approximately 10% by weight of carboxylic acid functional groups, commercially available from Union Carbide Corp., Danbury, Conn. Examples of graft-copolymerized functionalized polyolefins include maleic anhydride-grafted polypropylene, such as the EPOLENE series of waxes commercially available from Eastman Chemical Co., Kingsport, Tenn. and QUESTRON, commercially available from Himont U.S.A., Inc., Wilmington, Del. Epoxidized KRATON liquid polymers, such as L-207 available from Shell Chemical Co., Houston, Tex., may also be useful as compatibilizers. Additional polyepoxides useful as compatibilizers in the present invention include liquid, epoxidized conjugated dienes, such as POLY BD 600 and POLY BD 605, commercially available from Elf Atochem North America, Inc., and epoxidized polypropylene, such as XB602, commercially available from DuPont Chemicals, Wilmington, Del.

Physical blowing agents are preferred in the process of the present invention because they do not decompose at high temperatures as chemical blowing agents can. When a physical blowing agent is used, process temperatures are only limited by the decomposition temperature or curing temperature of the thermoset and its curative. In addition, physical blowing agents are preferred over chemical blowing agents when production of low density foams is desired, because physical blowing agents generally are able to produce larger amounts of gas per unit volume of polymer matrix.

Carbon dioxide is a preferred physical blowing agent because thermosetting monomers such as epoxy resins are more soluble in $CO_2$ than are the high molecular weight thermoplastic materials comprising the continuous phase of the polymer matrix. This difference allows for the creation of $CO_2$ domains rich in thermosetting monomers within the thermoplastic matrix. When the melt mixture comprising a thermoplastic material homogeneously mixed with a thermoset material and $CO_2$ is exposed to a low pressure, e.g., upon extrusion from a high pressure environment, the $CO_2$ expands resulting in cell nucleation and formation. The $CO_2$ then escapes from the thermoplastic matrix into the atmosphere, leaving behind the thermoset material. As a result, thermoset material may be deposited within the cells formed by the $CO_2$ expansion. For example, thermoset material may line the walls of cells formed in the thermoplastic matrix, or may form droplets within the cell. The thermoset material may also be entrained in the thermoplastic matrix as a second, discontinuous phase. It may also be partitioned between the cells and thermoplastic matrix.

Batch Process

Foams of the present invention may be produced via a batch process, employing a pressure vessel such as a stainless steel reactor, optionally equipped with agitation capabilities, high-pressure windows (e.g., sapphire) for observation of the cell contents and additional pressure handling systems for the addition of various materials under high pressure conditions. The reactor can be equipped with heating and/or cooling elements. If desired, the temperature can be monitored by a thermocouple device that can be connected to a temperature controller, which optionally can be microprocessor controlled. The reactor may also be fitted with a microprocessor process control unit. Additionally, the reactor may be equipped with a venting mechanisms to release pressure and isolate the foamed substrate.

To produce the foams of the present invention by a batch process, a view cell may be charged with the thermoplastic substrate along with the thermoset monomers containing photoinitiator. The cell may be sealed, filled with carbon dioxide, then brought to the desired temperature and pressure and allowed to equilibrate for a designated period of time. The vessel may then be cooled, followed by venting of the carbon dioxide. Alternatively, the vessel can be vented and cooled simultaneously from elevated pressure and temperature, and the foamed substrates retrieve d upon venting. Another variation of the batch process, which may be used in some cases to avoid deposition of excess thermoset monomer on the exterior of the thermoplastic substrate, is to place the thermoplastic substrate in one pressure vessel in series with another vessel containing the thermoset monomer with initiator. The system may be allowed to equilibrate at elevated temperature and pressure as with the single vessel system, followed by cooling/venting to isolate the foamed thermoplastic/thermoset material. Alternatively, the thermoplastic may be charged to the pressure vessel, heated and pressurized with carbon dioxide, followed by the introduction of a mixture of carbon dioxide and the thermosetting monomer at elevated temperature and pressure via an additional pressure handling system.

The specific conditions for preparation of various thermoplastic/thermoset foams can be optimized depending on the properties and characteristics of the particular composition being processed. The batch process can allow for the production of foams having cell sizes of approximately 1 to 200 micrometers. The batch process can also be used to make foam materials that are limited in thickness only by the molding or processing equipment available. When foams are to be subsequently cured by irradiation, the depth to which the irradiation can penetrate typically limits the thickness of the foam.

Continuous Process

The foams of the present invention may be made in a continuous process, e.g, in a single extruder or tandem extruder system. When using a single extruder the thermoplastic and thermoset polymeric materials typically are fed into the first zone of the extruder, although the thermoset material may be added downstream. The thermoset monomer may be added before, or at the same time as, the blowing agent. Alternatively, the blowing agent may be added before the thermoset monomer. The extruder screw preferably has mixing and conveying elements that knead the mixture of materials and move it through the extruder.

The polymeric materials may be added to the extruder in any convenient form, including pellets, billets, packages, strands, and ropes. Additives may be added with the polymer material or further downstream. If a chemical blowing agent is used it is typically added with the polymer materials. If a physical blowing agent is used it is typically injected downstream from the point at which the polymer materials have melted. The addition of a blowing agent to the thermoplastic polymer can enable the formation of foams at lower processing temperatures than would otherwise be needed. This occurs when the blowing agent lowers the glass transition temperature of, or plasticizes, the thermoplastic material.

The polymer materials, additives, and blowing agent can be melt-mixed in the extruder to prepare a foamable, extrudable composition in which the thermoset monomer, blowing agent, and any other additives are preferably distributed homogeneously throughout a molten thermoplastic continuous phase. Operating conditions such as screw speed, screw length, pressure, and temperature, may be selected to achieve such homogeneous distribution. Preferable operating conditions will depend upon the properties and characteristics of the particular composition being processed. The operating pressure in the extruder is preferably sufficient to prevent nucleation and cell formation in the extruder. The operating temperature in the extruder is preferably sufficient to melt all of the polymers in the melt mix without triggering the cure of any thermoset monomer. If a chemical blowing agent is used, the operating conditions should be such that the blowing agent will decompose to produce a gas.

At the exit end of the extruder, the foamable, extrudable composition is preferably metered into a die, which has a shaping exit orifice (e.g., an annular, rod, profile, or slit die). As the composition exits the shaping orifice, it is exposed to a reduced pressure, typically ambient pressure. The pressure drop causes the physical blowing agent (or gas produced by the chemical blowing agent) to expand, leading to nucleation and cell formation, thereby causing foaming of the polymer composition.

The shape of the foam will be dictated by the shape of the orifice. A variety of shapes may be produced such as a continuous sheet, tube, rod, etc. Foams of varying thicknesses can be prepared by the continuous process of the invention, depending upon the limitations of available equipment (die orifice size, processing speed, etc.).

Materials

Preferred materials useful in the invention fall into two broad categories and several subcategories. The first category is those materials that are thermoplastic or thermoformable. The second category is that of cationically-curable thermosets or thermosettable monomers and oligomers. Thermosets are materials that are cured or polymerized into substantially infusible or insoluble products under the influence of energy (heat, light, sound) or catalysis, including addition and condensation polymerization, as well as crosslinking. The scope of the present invention produces combinations of at least one thermoplastic and at least one thermoset in order to prepare useful end products.

Thermosets and thermoplastics can be present in weight ratios of from about 1:99 (thermoset:thermoplastic) to about 45:55, based on the total weight of thermosets plus thermoplastics in the composition.

Thermoplastic Polymers

A wide variety of polymers are known to be thermoplastic. Thermoplastic polymers include polyesters, polycarbonates, polyurethanes, polysiloxanes, polyacrylates, polyarylates, polyvinyls, polyethers, polyolefins, polyamides, fluoropolymers, cellulosics, and combinations and composites thereof. Preferred thermoplastics include polyesters, polyamides, polyurethanes, and polyolefins.

Polyesters useful in the invention include condensation polymers of aliphatic or aromatic polycarboxylic acids with aliphatic or aromatic polyols, so long as the resultant polyesters exhibit thermoplastic behavior at temperatures less than the degradation temperatures of a thermoset or thermoplastic with which it is combined. Useful polyesters are, for example, polycondensates based on polyols and, optionally, monohydric alcohols, on polycarboxylic acids and optionally monobasic carboxylic acids and/or on hydroxycarboxylic acids.

Particularly suitable polycarboxylic acids for producing polyesters are those corresponding to the general formula

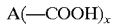

wherein A represents a covalent bond when x represents (2), or A represents an x-functional, aliphatic group preferably containing from 1 to 20 carbon atoms, a cycloaliphatic group preferably containing from 5 to 16 carbon atoms, an aliphatic-aromatic group preferably containing from 7 to 20 carbon atoms, an aromatic group preferably containing from 6 to 15 carbon atoms or an aromatic or cycloaliphatic group having 2 to 12 carbon atoms containing heteroatoms, such as N, O or S, in the ring, and x represents an integer of from 2 to 4, preferably 2 or 3. Preferred examples of such polycarboxylic acids are oxalic acid, malonic acid, succinic acid, glutaric acid, adipic acid, trimethyl adipic acid, azelaic acid, sebacic acid, decane dicarboxylic acid, dodecane dicarboxylic acid, fumaric acid, maleic acid, hexahydroterephthalic acid, phthalic acid, isophthalic acid, terephthalic acid, benzene-1,3,5-tricarboxylic acid, benzene-1,2,4-tricarboxylic acid, benzene-1,2,3-tricarboxylic acid, naphthalene-1,5-dicarboxylic acid, benzophenone-4,4'-dicarboxylic acid, diphenylsulphone-4,4'-dicarboxylic acid, butane tetracarboxylic acid, tricarballylic acid, ethylene tetracarboxylic acid, pyromellitic acid, benzene-1,2,3,4-tetracarboxylic acid, benzene-1,2,3,5-tetracarboxylic acid.

Preferred hydroxycarboxylic acids are those corresponding to the general formula

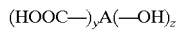
(HOOC—)$_y$A(—OH)$_z$ wherein A is as defined above; and y and z independently represent an integer of from 1 to 3, preferably 1 or 2.

Preferred examples are glycolic acid, lactic acid, mandelic acid, malic acid, citric acid, tartaric acid, 2-, 3- and 4-hydroxybenzoic acid and also hydroxybenzene dicarboxylic acids.

Polyols suitable for use in the production of the polyesters are, in particular, those corresponding to the general formula

B(—OH)$_a$ wherein B represents an a-functional aliphatic radical containing from 2 to 20 carbon atoms, a cycloaliphatic radical containing from 5 to 16 carbon atoms, an araliphatic radical containing from 7 to 20 carbon atoms, an aromatic radical containing from 6 to 15 carbon atoms and a heterocyclic radical comprising 2 to 12 carbon atoms and containing N, O or S; and a represents an integer of from 2 to 6, preferably 2 or 3.

Preferred examples of such polyols are ethylene glycol, 1,2- and 1,3-propane diol, 1,2-, 1,3-, 1,4- and 2,3-butanediol, 1,5-pentane diol, 2,2-dimethyl-1,3-propane diol, 1,6- and 2,5-hexane diol, 1,12-dodecane diol, 1,12- and 1,18-octadecane diol, 2,2,4- and 2,4,4-trimethyl-1,6-hexane diol, trimethylol propane, trimethylol ethane, glycerol, 1,2,6-hexane triol, pentaerythritol, mannitol, 1,4-bis-hydroxymethyl cyclohexane, cyclohexane-1,4-diol, 2,2-bis-(4-hydroxycyclohexyl)-propane, bis-(4-hydroxyphenyl)-methane, bis-(4-hydroxyphenyl)-sulphone, 1,4-bis-(hydroxymethyl)-benzene, 1,4-dihydroxy-benzene, 2,2-bis-(4-hydroxyphenyl)-propane, 1,4-bis-(ω-hydroxyethoxy)-benzene, 1,3-bis-hydroxyalkyl hydantoins, tris-hydroxyalkyl isocyanurates and tris-hydroxyalkyl-triazolidane-3,5-diones.

Other polyols suitable for use in the production of the polyester polycarboxylic acids are the hydroxyalkyl ethers obtained by the addition of optionally substituted alkylene oxides, such as ethylene oxide, propylene oxide butylene oxide and styrene oxide, onto the above-mentioned polyols.

Preferred examples of such polyols are diethylene glycol, triethylene glycol, dipropylene glycol, tripropylene glycol, dibutylene glycol, 1,4-bis-(2-hydroxyethoxy)cyclohexane, 1,4-bis-(2-hydroxyethoxy-methyl)-cyclohexane, 1,4-bis-(2-hydroxyethoxy)-benzene, 4,4'-bis-(2-hydroxyethoxy)-diphenylmethane, -2-diphenyl-propane, -diphenyl ether, -diphenyl sulphone, -diphenyl ketone and -diphenyl cyclohexane.

The carboxylic acids or carboxylic acid derivatives used and the polyols used may, of course, also be oligomeric.

The residues of alcohols and acids containing cycloaliphatic structures are to be understood to be the alcohols and acids, respectively, reduced by the hydrogen atoms of the alcoholic groups and by the hydroxyl radicals of the carboxyl groups. Particularly preferred alcohol and acid residues having cycloaliphatic structures are dimerized fatty acids and dimerized fatty alcohols.

Preferred polyesters are described, for example, in DE-OS No. 2,942,680 and in U.S. Pat. No. 3,549,570. The number average molecular weight of preferred polyesters can be from about 700 to about 8000.

Polyamides useful as thermoformable components of the present invention include fully pre-polymerized condensation polymers characterized by the presence of the amide group, —CONH—, in the polymer backbone. Polyamides are prepared, e.g, by the condensation polymerization of a polyfunctional carboxyl-containing species such as a dicarboxylic acid or a dicarboxylic acid halide with a polyfunctional amine, or by self-condensation of a bifunctional molecule that has both amine- and carboxyl-functionality. The reactive species can be individually aliphatic, aromatic, carbocyclic, polycyclic, saturated, unsaturated, straight chain or branched. Polyamides can be the polymerization product of a single polycarboxyl-functional species with a single polyamine species as well as the polymerization product of a mixture of polycarboxyl species and a mixture of polyamine species. Industry has developed a number of routes to polyamides, all of which are intended to be included in the present definition. While the general class of polyamides known as "nylon" is the most abundant in commerce, the present definition is not intended to be limited thereto. Preferred polyamides for the present invention include Nylon 6, Nylon 6,6, Nylon 6,10, Nylon 12, and the family of Nylon materials available from DuPont Co., Wilmington, Del. and the VERSAMIDE family of polyamides available from Henkel Corp., Ambler, Pa.

Thermoplastic urethane polymers useful in the present invention comprise one or more compounds that comprise at least one isocyanate group and one or more compounds that comprise at least one —OH functional group that is coreactive with an isocyanate group. Useful monoisocyanates include octadecyl isocyanate, butyl isocyanate, hexyl isocyanate, phenyl isocyanate, benzyl isocyanate, naphthyl isocyanate, and the like. Useful diisocyanates include 1,6-hexamethylene diisocyanate (HMDI), 1,4-tetramethylene diisocyanate, 2,4- and 2,6-toluene diisocyanate (TDI), diphenylmethane-4,4'-diisocyanate (MDI), cyclohexane 1,3- and 1,4-diisocyanate, isophorone diisocyanate (IPDI), 1,5- and 1,4-naphthalene diisocyanate, dicyclohexylmethane-4,4'-diisocyanate, and the like.

Thermoplastic homopolymeric polyolefins useful in the invention include polyethylene, polypropylene, poly-1-butene, poly-1-pentene, poly-1-hexene, poly-1-octene and related polyolefins. Preferred homopolymeric polyolefins include polyethylene (e.g., Dow HDPE 25455, available from Dow Chemical Co., Midland, Mich.) and polypropylene (e.g., Shell DS5D45, available from Shell Chemicals, Houston, Tex., or Exxon ESCORENE 3445 and 3505G, available from Exxon Chemicals, Houston, Tex.). Also useful are copolymers of these alpha-olefins, including poly (ethylene-co-propylene) (e.g., SRD7-462, SRD7-463 and DS7C50, each of which is available from Shell Chemicals), poly(propylene-co-1-butene) (e.g., SRD6-328, also available from Shell Chemicals), and related copolymers. Preferred copolymers are poly(ethylene-co-propylene). Also useful is the VESTOPLAST series of polyolefins, available from Hüls America Inc., Piscataway, N.J.

The foams of the invention also comprise functionalized polyolefins, i.e., polyolefins that have additional chemical functionality, obtained through either copolymerization of olefin monomer with a functional monomer or graft copolymerization subsequent to olefin polymerization. Typically, such functionalized groups include O, N, S, P, or halogen heteroatoms. Such reactive functionalized groups include carboxylic acid, hydroxyl, amide, nitrile, carboxylic acid anhydride, or halogen groups. Many functionalized polyolefins are available commercially. For example, copolymerized materials include ethylene-vinyl acetate copolymers, such as the ELVAX series, commercially available from DuPont Chemicals, Wilmington, Del., the ELVAMIDE series of ethylene-polyamide copolymers, also available from DuPont, and ABSITE 1060WH, a polyethylene-based copolymer comprising approximately 10% by weight of carboxylic acid functional groups, commercially available from Union Carbide Corp., Danbury, Conn. Examples of graft-copolymerized functionalized polyolefins include maleic anhydride-grafted polypropylene, such as the EPOLENE series of waxes commercially available from Eastman Chemical Co., Kingsport, Tenn. and QUESTRON, commercially available from Himont U.S.A., Inc., Wilmington, Del.

Thermosetting Polymers

Cationically-curable thermosetting polymers, or "thermosets," useful in the invention include epoxies, cyanate esters, and vinyls (i.e., polymers obtained from polymerization of ethylenically-unsaturated monomers other than acrylates). These polymers can be prepared by cationic polymerization of their respective monomers or condensation reactants.

Cationically-polymerizable monomers useful in the invention include but are not limited to epoxy-containing materials, cyanate esters, alkyl vinyl ethers, cyclic ethers, styrene, divinyl benzene, vinyl toluene, N-vinyl compounds, 1-alkyl olefins (alpha olefins), lactams, ring-strained dienes, and cyclic acetals.

Cyclic ethers (e.g., epoxides) that can be polymerized in accordance with this invention include those described in Frisch and Reegan, *Ring-Opening Polymerizations* Vol. 2 (1969). Suitable 1,2-cyclic ethers include monomeric and polymeric types of epoxides. Particularly suitable are the aliphatic, cycloaliphatic, and glycidyl ether type 1,2 epoxides. A wide variety of commercial epoxy resins are available and listed in Lee and Neville, *Handbook of Epoxy Resins* (1967) and P. Bruins, *Epoxy Resin Technology* (1968). Representative of 1,3- and 1,4-cyclic ethers that can be polymerized in accordance with this invention are oxetane, 3,3-bis(chloromethyl)oxetane, and tetrahydrofuran.

Additional cationically-polymerizable monomers are described in U.S. Pat. No. 5,252,694 at col. 4, line 30 through col. 5, line 34, the description of which is incorporated herein by reference. Preferred monomers of this class include epoxy resins EPON828, and EPON1001F (Shell Chemicals, Houston, Tex.) and the ERL series of cycloaliphatic epoxy monomers such as ERL4221 or ERL-4206 (Union Carbide Corp., Danbury, Conn.).

Optionally, monohydroxy- and polyhydroxy-alcohols may be added to the curable compositions of the invention, as chain-extenders for the epoxy resin. Suitable examples of alcohols include but are not limited to methanol, ethanol, 1-propanol, 2-propanol, 1-butanol, 1-pentanol, 1-hexanol, 1-heptanol, 1-octanol, pentaerythritol, 1,2-propanediol, ethylene glycol, 1,4-butanediol, 1,5-pentanediol, 1,6-hexanediol, 1,4-cyclohexane dimethanol, 1,4-cyclohexanediol and glycerol.

Preferably, compounds containing hydroxyl groups, particularly compounds containing from about 2 to 50 hydroxyl groups and above all, compounds having a weight average molecular weight of from about 50 to 25,000, preferably from about 50 to 2,000, for example, polyesters, polyethers, polythioethers, polyacetals, polycarbonates, poly(meth) acrylates, and polyester amides, containing at least 2, generally from about 2 to 8, but preferably from about 2 to 4 hydroxyl groups, or even hydroxyl-containing prepolymers of these compounds, are representatives compounds useful in accordance with the present invention and are described, for example, in Saunders, *High Polymers, Vol. XVI*, "Polyurethanes, Chemistry and Technology," Vol. I, pages 32–42, 44–54 and Vol. II, pages 5–6, 198–99 (1962, 1964), and in *Kunststoff-Handbuch*, Vol. VII, pages 45–71 (1966). It is, of course, permissible to use mixtures of the above-mentioned compounds containing at least two hydroxyl groups and having a molecular weight of from about 50 to 50,000 for example, mixtures of polyethers and polyesters.

In some cases, it is particularly advantageous to combine low-melting and high-melting polyhydroxyl containing compounds with one another (German Offenlegungsschrift No. 2,706,297).

Low molecular weight compounds containing at least two reactive hydroxyl groups (molecular weight (Mn) from about 50 to 400) suitable for use in accordance with the present invention are compounds preferably containing hydroxyl groups and generally containing from about 2 to 8, preferably from about 2 to 4 reactive hydroxyl groups. It is also possible to use mixtures of different compounds containing at least two hydroxyl groups and having a molecular weight in the range of from about 50 to 400. Examples of such compounds are ethylene glycol, 1,2- and 1,3-propylene glycol, 1,4- and 2,3-butylene glycol, 1,5-pentanediol, 1,6-hexanediol, 1,8-octanediol, neopentyl glycol, 1,4-cyclohexane dimethanol, 1,4-cyclohexanediol, trimethylolpropane, 1,4-bis- hydroxymethyl cyclohexane, 2-methyl-1,3-propanediol, dibromobutenediol (U.S. Pat. No. 3,723,392), glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxy diphenyl propane and dihydroxy methyl hydroquinone.

Other polyols suitable for the purposes of the present invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschrift Nos. 2,639,084, 2,714,084, 2,714,104, 2,721,186, 2,738,154 and 2,738,512).

It is contemplated that polyfunctional alcohols such as carbowaxes poly(ethylene glycol), poly(ethylene glycol methyl ether), poly(ethylene glycol) tetrahydrofurfuryl ether, poly(propylene glycol) may also be used in the compositions of the present invention.

Higher molecular weight polyols include the polyethylene and polypropylene oxide polymers in the molecular weight (Mn) range of 200 to 20,000 such as the CARBOWAX polyethyleneoxide materials available from Union Carbide Corp., Danbury, Conn., caprolactone polyols in the molecular weight range of 200 to 5,000 such as the TONE polyol materials available from Union Carbide, polytetramethylene ether glycol in the molecular weight range of 200 to 4,000, such as the TERATHANE materials available from DuPont Co., Wilmington, Del., hydroxyl-terminated polybutadiene resins such as the POLY BD materials available from Elf Atochem, phenoxy resins, such as those commercially available from Phenoxy Associates, Rock Hill, S.C. or equivalent materials supplied by other manufacturers.

Bifunctional monomers may also be used and examples that are useful in this invention possess at least one cationically reactive functionality per monomer. Examples of such monomers include, but are not limited to glycidyl (meth) acrylate, hydroxyethyl (meth)acrylate, hydroxypropyl methacrylate and hydroxybutyl acrylate.

Thermosetting cyanate ester resins useful in the invention comprise cyanate ester compounds (monomers and oligomers) each having one or preferably two or more —OCN functional groups, and typically having a cyanate equivalent weight of from about 50 to about 500, preferably from about 50 to about 250. Molecular weight of the monomers and oligomers are typically from about 150 to about 2000. If the molecular weight is too low, the cyanate ester may have a crystalline structure which is difficult to dissolve. If the molecular weight is too high, the compatibility of the cyanate ester with other resins may be poor.

Preferred compositions of the invention include one or more cyanate esters according to formulas I, II, III or IV. Formula I is represented by

where p is an integer from 1 to 7, preferably from 2 to 7, and wherein Q comprises a mono-, di-, tri-, or tetravalent aromatic hydrocarbon containing from 5 to 30 carbon atoms and zero to 5 aliphatic, cyclic aliphatic, or polycyclic aliphatic, mono- or divalent hydrocarbon linking groups containing 7 to 20 carbon atoms. Optionally, Q may comprise 1 to 10 heteroatoms selected from the group consisting of non-peroxidic oxygen, sulfur, non-phosphino phosphorus, non-amino nitrogen, halogen, and silicon.

Formula II is represented by

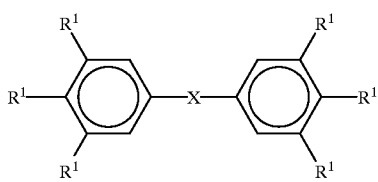

where X is a single bond, a lower alkylene group having from 1 to 4 carbons, —S—, or an SO$_2$ group; and where each R$^1$ is independently hydrogen, an alkyl group having from one to three carbon atoms, or a cyanate group (—OC≡N), with the proviso that at least one R$^1$ group is a cyanate group. In preferred compounds, each of the R$^1$ groups is either —H, methyl or a cyanate group, with at least two R$^1$ groups being cyanate groups.

Formula III is represented by

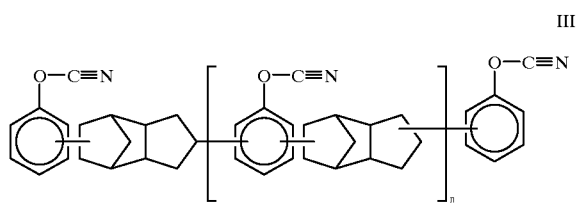

where n is a number from 0 to about 5.

Formula IV is represented by

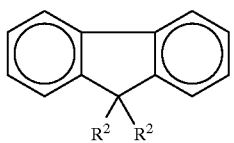

wherein each R$^2$ independently is

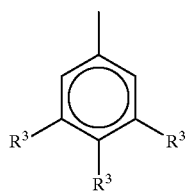

wherein each R$^3$ is independently —H, a lower alkyl group having from about 1 to about 5 carbon atoms, or a cyanate ester group, and preferably is a hydrogen, methyl or a cyanate ester group, with the proviso that the R$^3$s together comprise at least one cyanate ester group.

Useful cyanate ester compounds include, but are not limited to the following:

1,3- and 1,4-dicyanatobenzene;
2-tert-butyl-1,4-dicyanatobenzene;
2,4-dimethyl-1,3-dicyanatobenzene;
2,5-di-tert-butyl-1,4-dicyanatobenzene;
tetramethyl-1,4-dicyanatobenzene;
4-chloro-1,3-dicyanatobenzene;
1,3,5-tricyanatobenzene;
2,2'- and 4,4'-dicyanatobiphenyl;
3,3',5,5'-tetramethyl-4,4'-dicyanatobiphenyl;
1,3-, 1,4-, 1,5-, 1,6-, 1,8-, 2,6-, and 2,7-dicyanatonaphthalene;
1,3,6-tricyanatonaphthalene;
bis(4-cyanatophenyl)methane;
bis(3-chloro-4-cyanatophenyl)methane;
bis(3,5-dimethyl-4-cyanatophenyl)methane;
1,1-bis(4-cyanatophenyl)ethane;
2,2-bis(4-cyanatophenyl)propane;
2,2-bis(3,3-dibromo-4-cyanatophenyl)propane;
2,2-bis(4-cyanatophenyl)-1,1,1,3,3,3-hexafluoropropane;
bis(4-cyanatophenyl)ester;
bis(4-cyanatophenoxy)benzene;
bis(4-cyanatophenyl)ketone;
bis(4-cyanatophenyl)thioether;
bis(4-cyanatophenyl)sulfone;
tris(4-cyanatophenyl)phosphate, and
tris(4-cyanatophenyl)phosphate.

Also useful are cyanic acid esters derived from phenolic resins, e.g., as disclosed in U.S. Pat. No. 3,962,184, cyanated novolac resins derived from novolac, e.g., as disclosed in U.S. Pat. No. 4,022,755, cyanated bis-phenol-type polycarbonate oligomers derived from bisphenol-type polycarbonate oligomers, as disclosed in U.S. Pat. No. 4,026,913, cyano-terminated polyarylene ethers as disclosed in U.S. Pat. No. 3,595,900, and dicyanate esters free of ortho hydrogen atoms as disclosed in U.S. Pat. No. 4,740,584, mixtures of di- and tricyanates as disclosed in U.S. Pat. No. 4,709,008, polyaromatic cyanates containing polycyclic aliphatic groups as disclosed in U.S. Pat. No. 4,528,366, e.g., QUATREX 7187, now available from Ciba Geigy, Hawthorne, N.Y., fluorocarbon cyanates as disclosed in U.S. Pat. No. 3,733,349, and cyanates disclosed in U.S. Pat. Nos. 4,195,132, and 4,116,946, all of the foregoing patents being incorporated herein by reference for teachings related to cyanates.

Polycyanate compounds obtained by reacting a phenol-formaldehyde precondensate with a halogenated cyanide are also useful.

Examples of preferred cyanate ester resin compositions include low molecular weight ($M_n$) oligomers, e.g, from about 250 to about 5000, e.g., bisphenol-A dicyanates such as AROCY "B-30 Cyanate Ester Semisolid Resin"; low molecular weight oligomers of tetra o-methyl bis-phenol F dicyanates, such as "AROCY M-30 Cyanate Ester Semisolid Resin"; low molecular weight oligomers of thiodiphenol dicyanates, such as AROCY "T-30", all of which are commercially available from Ciba-Geigy Corp., Hawthorne, N.Y.

Polyhydroxyl compounds (e.g., "polyols"), as described above, can be useful in the preparation of cyanate esters useful in the invention.

Blowing Agents

Chemical blowing agents may be used to foam the thermoplastic-thermoset polymeric melt mixture. Suitable chemical blowing agents include a sodium bicarbonate and citric acid blend, dinitrosopentamethylenetetramine, p-toluenesulfonyl hydrazide, 4–4'-oxybis(benzenesulfonyl hydrazide), azodicarbonamide (1,1'-azobisformamide), p-toluenesulfonyl semicarbazide, 5-phenyltetrazole, 5-phenyltetrazole analogues, diisopropylhydrazodicarboxylate, 5-phenyl-3,6-dihydro-1, 3,4-oxadiazin-2-one, and sodium borohydride. Chemical blowing agents may typically be added in an amount of 0.1 to 10 weight %, based on the total weight of the mixture.

A physical blowing agent useful in the present invention is any naturally occurring atmospheric material which is a vapor at the temperature and pressure at which the melt mixture exits the die. The physical blowing agent may be introduced into the polymeric material as a gas or liquid, preferably as a liquid, and may be in a supercritical state. The physical blowing agents used will depend on the properties sought in the resulting foam articles. Factors considered in choosing a blowing agent are its toxicity, vapor pressure profile, ease of handling, and solubility with regard to the polymeric materials used. Flammable blowing agents such as pentane, butane and other organic materials, such as hydrofluorocarbons (HFC) and hydrochlorofluorocarbons (HCFC) may be used, but non-flammable, non-toxic, non-ozone depleting blowing agents are preferred because they are easier to use, e.g., fewer environmental and safety concerns. Suitable physical blowing agents include, e.g., carbon dioxide, nitrogen, $SF_6$, nitrous oxide, perfluorinated fluids, such as $C_2F_6$, argon, helium, noble gases, such as xenon, air (nitrogen and oxygen blend), and blends of these materials. Physical blowing agents may typically be added in an amount of 0.1 to 20 weight %, based on total weight of the mixture, depending on the solubility of the blowing agent in the thermoplastic material.

Additives

It is also within the scope of this invention to add optional adjuvants.

Surfactants may be useful adjuvants in preparing the foams of the invention. Useful materials include polar and non-polar surfactants that can be anionic, cationic, or non-ionic in nature. Surfactants facilitate wetting of the thermoplastic component by the thermoset component of the invention. Particularly useful surfactants include fluorinated surfactants such as FC 430 (Minnesota Mining and Manufacturing ("3M"), St. Paul, Minn.).

Other additives useful in the invention include thixotropic agents; tackifiers (e.g., rosin esters, terpenes, phenols, and aliphatic, aromatic, or mixtures of aliphatic and aromatic synthetic hydrocarbon resins), plasticizers (other than physical blowing agents), nucleating agents (e.g, talc, silicon, or $TiO_2$), hydrophobic or hydrophilic silica, calcium carbonate, flame retardants, finely ground polymeric particles (e.g., polyester, nylon, or polypropylene), expandable microspheres, toughening agents such as those taught in U.S. Pat. No. 4,846,905; pigments; dyes; fillers; abrasive granules, stabilizers, light stabilizers, antioxidants, flow agents, bodying agents, flatting agents, colorants, binders, fungicides, bactericides, surfactants; glass and ceramic beads; and reinforcing materials, such as woven and non-woven webs of organic and inorganic fibers, such as polyester, polyimide, glass fibers and ceramic fibers; and other additives as known to those skilled in the art can be added to the compositions of this invention. These can be added in an amount effective for their intended purpose; typically, amounts up to about 25 parts of adjuvant per total weight of formulation can be used. The additives can modify the properties of the basic composition to obtain a desired effect. The desired properties are largely dictated by the intended application of the foam or foam article. Furthermore, the additives can be reactive components such as materials containing reactive hydroxyl functionality. Alternatively, the additives can be also substantially unreactive, such as fillers, including both inorganic and organic fillers.

Optionally, it is within the scope of this invention to include photosensitizers or photoaccelerators in the radiation-sensitive compositions. Use of photosensitizers or photoaccelerators alters the wavelength sensitivity of radiation-sensitive compositions employing the latent catalysts of this invention. This is particularly advantageous when the latent catalyst does not strongly absorb the incident radiation. Use of a photosensitizer or photoaccelerator increases the radiation sensitivity allowing shorter exposure times and/or use of less powerful sources of radiation. Examples of such photosensitizers are given in Table 2-1 of the reference, S. L. Murov, *Handbook of photochemistry*, Marcel Dekker Inc., N.Y., 27–35 (1973), and include pyrene, fluoranthrene, xanthone, thioxanthone, benzophenone, acetophenone, benzil, benzoin and ethers of benzoin, chrysene, p-terphenyl, acenaphthene, naphthalene, phenanthrene, biphenyl, substituted derivatives of the preceding compounds, and the like. When present, the amount of photosensitizer of photoaccelerator used in the practice of the present invention is generally in the range of 0.01 to 10 parts, and preferably 0.1 to 1.0 parts, by weight of photosensitizer or photoaccelerator per part of organometallic salt or onium salt.

Curing

The thermoset material in the foam may be cured at the time the foam is made or at a later time. The thermoset material may be cured by known curing means such as actinic radiation (e.g., UV radiation, visible light radiation, or a combination of UV and/or visible light radiation and heat), and electron beam radiation. The thermoset material may be left uncured, cured partially, or cured totally. The thermoset material may also be cured selectively, meaning that some areas of the foam can be cured, while others remain uncured. This can be accomplished by masking the areas to remain uncured from exposure to the curing means, thereby providing a specific pattern of uncured and cured (or partially cured) foam.

The curing process may employ cationic photoinitiators. A photoinitiator may be added to the thermoset material prior to mixing the thermoset with the thermoplastic material or it may be added during the mixing process. Advantageously, cationic photoinitiators are generally not activated at the high processing and/or foaming temperatures of the method of the invention, allowing activation of the photoinitiators by subsequent irradiation. Therefore, the thermoset may be cured at any time after production of foamed materials. Suitable organometallic complex salts useful as cationic initiators include those described in U.S. Pat. No. 5,059,701 and such description is incorporated herein by reference. In addition to those described in U.S. Pat. Nos. 5,059,701 and 5,089,536, the organometallic complex salts described in EPO No. 109,851 are also useful in the present invention. Useful organometallic complex salts used in the present invention have the following formula:

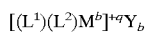

wherein
$M^b$ represents a metal selected from the group consisting of: Cr, Mo, W, Mn, Re, Fe, and Co;

b represents an integer having a value of 1, 2, or 3;

$L^1$ represents 1 or 2 ligands contributing pi-electrons that can be the same or different ligand selected from the group of: substituted and unsubstituted $eta^3$-allyl, $eta^5$-cyclopentadienyl, and $eta^7$-cycloheptatrienyl, and $eta^6$-aromatic compounds selected from $eta^6$-benzene and substituted $eta^6$-benzene compounds and compounds having 2 to 4 fused rings, each capable of contributing 3 to 8 pi-electrons to the valence shell of $M^p$;

$L^2$ represents none, or 1 to 3 ligands contributing an even number of sigma-electrons that can be the same or different ligand selected from the group of: carbon monoxide, nitrosonium, triphenyl phosphine, triphenyl stibine and derivatives of phosphorus, arsenic and antimony, with the proviso that the total electronic charge contributed to $M^p$ results in a net residual positive charge of q to the complex;

q is an integer having a value of 1 or 2, the residual charge of the complex cation;

Y is a halogen-containing complex anion selected from $BF_4^-$, $AsF_6^-$, $PF_6^-$, $SbF_5OH^-$, $SbF_6^-$, and $CF_3SO_3^-$; and b is an integer having a value of 1 or 2, the number of complex anions required to neutralize the charge q on the complex cation.

Preferred organometallic initiators are the cyclopentadienyl iron arenes (CpFe(arenes)), and preferably, $SbF_6^-$ is the counterion. CpFe(arenes) are preferred because they are very thermally stable yet are excellent photoinitiation catalysts.

Useful photochemical cationic initiators comprising onium salts have been described as having the structure ET, wherein:

E is an organic cation selected from diazonium, iodonium, and sulfonium cations, more preferably E is selected from diphenyliodonium, triphenylsulfonium and phenylthiophenyl diphenylsulfonium; and T is an anion, the counterion of the onium salts including those in which T is organic sulfonate, or halogenated metal or metalloid.

Particularly useful cationic initiators can comprise onium salts including, but are not limited to, aryl diazonium salts, diaryl iodonium salts, and triaryl sulfonium salts. Additional examples of the onium salts are described in U.S. Pat. No. 5,086,086, col. 4, lines 29–61, and such description is incorporated herein by reference.

Photoinitiators that are useful in the present invention include aromatic iodonium complex salts and aromatic sulfonium complex salts. The aromatic iodonium complex salts having the formula:

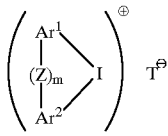

wherein $Ar^1$ and $Ar^2$ are aromatic groups having 4 to 20 carbon atoms and are selected from the group consisting of phenyl, thienyl, furanyl and pyrasolyl groups;

Z is selected from the group consisting of oxygen, sulfur,

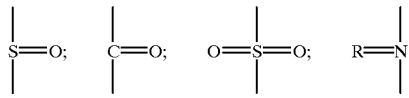

where R is aryl (having 6 to 20 carbon atoms, such as phenyl) or acyl (having 2 to 20 carbon atoms, such acetyl, benzoyl, etc.), a carbon-to-carbon bond, or

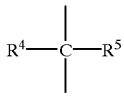

where $R^4$ and $R^5$ are independently selected from hydrogen, alkyl radicals of 1 to 4 carbon atoms, and alkenyl radicals of 2 to 4 carbon atoms;

m is zero or 1; and $T^-$ preferably is a halogen-containing complex anion selected from tetrafluoroborate, hexafluorophosphate, hexafluoroarsenate, and hexafluoroantimonate.

Aromatic sulfonium complex salt photoinitiators are described by the formula:

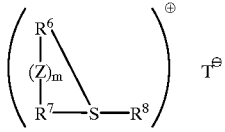

$R^6$, $R^7$ and $R^8$ can be the same or different, provided that at least one of such groups is aromatic and such groups can be selected from the aromatic groups having 4 to 20 carbon atoms (for example, substituted and unsubstituted phenyl, thienyl, furanyl) and alkyl radicals having 1 to 20 carbon atoms. The term "alkyl" as used here is meant to include substituted and unsubstituted alkyl radicals. Preferably, $R^6$, $R^7$ and $R^8$ are each aromatic groups; and Z, m and $T^-$ are as defined above.

Of the aromatic sulfonium complex salts that are suitable for use in the present invention, the preferred salts are triaryl-substituted salts such as triphenylsulfonium hexafluorophosphate and triphenylsulfonium hexafluoroantimonate. The triaryl substituted salts are preferred because they are more thermally stable than the mono- and diaryl substituted salts.

The initiator is present in a catalytically-effective amount and such amounts are typically in the range of about 0.01 parts to 5 parts, and more preferably in the range from about 0.025 to 2 parts by weight, based upon 100 total parts by weight of monomer or monomer mixture. If a mixture of initiators is used, the total amount of the mixture of initiators would be as if a single initiator was used.

Coextrusion

The foams of the present invention may be used to make materials or articles having two or more layers. This can be achieved by coextruding the foam or foamable materials with layers of other polymeric materials through an extruder die with an appropriate feedblock, e.g., a multi-layer feedblock, or by using a multi-layer die. Multi-layer feedblocks and 3-layer dies are available, for example, from Cloeren Company, Orange, Tex.

Many different embodiments of multi-layer foams may be made using the foams of the present invention. Materials or articles having multiple adjacent foam layers may be made with foam layers comprising the same or different materials. The coextrusion process can also be used to extrude a foam of this invention with other types of materials such as unfoamed polymeric materials. The foams of the present invention may comprise one or more interior and/or exterior layer(s) of a multi-layer construction. For example, every other layer may comprise a foam layer, or multiple foam layers may be adjacent to each other; multiple non-foam layers may be adjacent to each other, or any combination of the foregoing. Each foamable, extrudable mixture may be processed using the previously-described continuous method wherein the different melt mixtures are fed to different inlets of a multi-layer die, which feeds the mixtures together in layers prior to exiting the die. The layers typically can foam in the same manner as described above for the continuous process. When a multi-layer article is produced, it is preferable to form adjacent layers using materials having similar viscosities.

If materials that will form adjacent layers of a structure are heated to substantially different temperatures during processing, a die can be used that thermally isolates the different materials until just prior to their exiting the die (e.g., FIG. 4 of U.S. Pat. No. 5,599,602, incorporated by reference). This can diminish or eliminate negative effects of contacting materials having different temperatures such as melting or collapsing the foam or causing continued cell expansion.

Lamination

Multi-layer foam articles can also be prepared by affixing polymer or nonpolymer layers to a single or multi-layer foam article. These layers may be affixed by lamination. Suitable lamination techniques include, for example, post-production lamination, which is well known in the art; or extrusion lamination, which is described in U.S. Pat. No. 5,422,189 (incorporated by reference), Examples P1 and P2.

Materials suitable for lamination include barrier materials such as non-porous semi-crystalline polymers that are generally impervious to gases and liquids, e.g. semi-crystalline polyolefins; release materials such as materials having lower surface energies than materials with which they are contacted, e.g., silicones and fluoropolymers; woven materials such as cottons, scrims, and cloths; nonwoven materials such as polypropylenes and polyesters; and pressure sensitive adhesive materials such as polyacrylate copolymers and tackified styrenic copolymers.

Use

Foams of the invention may be used for many purposes including tape backings, films, fibers, coatings, and molded articles.

Foams of the present invention are especially suited for uses where variable modulus foams are desirable. For example, the flexographic printing industry can advantageously employ variable modulus foams. Flexographic printing is a technique in which an image-bearing, elastomeric printing plate, mounted on a rotating steel cylinder, is used to transfer ink to a substrate. Flexography is explained in more detail in *Flexography: Principles and Practices*, published by the Foundation of the Flexographic Technical Association, Ronkonkoma, N.Y. (1991).

The variables affecting print quality in flexographic printing include plate thickness and elasticity, press configuration, and class of printing (solid areas vs. half-tones, for example). The elastomeric nature of the plate means that the quality of the printed image depends, in part, on the method used to mount the plate to the cylinder. Typically, a double-sided adhesive foam tape is used to mount the plate.

For optimum print quality, the compressive characteristics of the foam tape must be taken into account. Different classes of flexographic printing require different degrees of stiffness in mounting tapes. For solid printing and line art, a stiff mounting tape is preferred. Combination printing, in which both solid and half-tone (or dot) printing areas are combined on a single printing plate, poses a challenge.

The foams of the present invention can provide a solution to this challenge. Foams and foam materials of the present invention can be made into articles having different moduli at different locations in or on the article; they can be made stiff in the solid printing or line art areas, and left softer in the dot or half-tone printing areas. As a result, the foams of the present invention can enhance the print quality of a combination plate over results obtained using a single-modulus foam. The foams of the present invention would be suitable, for example, in the flexographic plate constructions described in U.S. Pat. Nos. 5,074,209 and 5,275,102, both incorporated by reference.

Foams of the invention that incorporate thermoset material into the thermoplastic matrix may be more compatible with adhesives that may be coated thereon than would be thermoplastic-only foams. Because they typically comprise polar moieties, thermoset materials typically have a higher surface energy than thermoplastic materials. Accordingly, thermoset material residing at the surface of the thermoplastic continuous phase of a foam article can enhance the surface energy, polarity, or reactivity of the foam article. The higher surface energy can allow increased wetting of the article surface when it is brought into contact with an adhesive. Adhesives may be blended with the matrix material during processing or may be solvent-coated, melt-coated, or coextruded onto the surface of a foam article or material. For blended compositions, incorporation of a thermoset material can help compatibilize the adhesive with the thermoplastic matrix in any of these processes, due to the presence of, for example, polar moieties in both the thermoset and the adhesive.

Foams of the present invention can also be useful for encapsulation processes. Encapsulation can be used to isolate a reactive material until activation is desired. This can allow, e.g., cure-on-demand structural epoxies, selective triggering of adhesives, safe handling of potentially hazardous reactants, and PSA/structural hybrid adhesives. For example, thermoset materials and their curing catalysts may be encapsulated in the thermoplastic matrix. Alternatively, thermosettable materials and curing catalysts can be encapsulated in separate layers of a construction, for example, by coextruding or laminating thermoplastic layers of that separately encapsulate the thermosettable material and curing catalyst. Pressure, shear, abrasion or other means subsequently can be used to effect mixing of the thermoset and the curing catalyst. The encapsulated materials may be pure thermosets or thermosets carrying materials miscible with the thermosets. Other examples of the use of microcapsules in various materials may be found in *Microcapsule Processing Technology*, by Asaji Kondo, published by Marcel Dekker, Inc., New York (1979).

EXAMPLES

This invention may be illustrated by way of the following examples.

Test Methods

Density

Method 1.

Density of foam materials was measured at 25° C. in deionized water according to the method of ASTM D792–86. Samples were cut into 1.27×2.54 cm pieces, weighed on a METTLER AG245 high precision balance (Mettler-Toledo, Inc., Hightstown, N.J.), and placed underwater. The mass of water displaced was measured using the density measurement fixture.

Method 2.

Foam density was also measured in certain cases by punching 8 mm diameter circles from bulk samples, measuring the foam thickness with a micrometer, weighing the individual samples, and calculating an average density based on the computed volumes of the samples. A minimum of three samples was used per condition. Results obtained by this method were calibrated using samples of EVA foams commercially available as 96 and 192 Kg/m$^3$ foams from Sentinel Products Co., Hyannis, Mass.

Compression Modulus

Compression modulus (E') (the ratio of the compressive force applied to a substance per unit surface area to the change in volume of the substance per unit volume) was measured and calculated using a Rheometrics Solids Analyzer II equipped with a RHEOMETRICS ORCHESTRATOR software package (Rheometric Scientific, Piscataway, N.J.), and operated in parallel plate compression mode. Foam samples were prepared by solvent-wiping with methyl ethyl ketone to remove traces of liquid epoxy resin from the surface, then laminating 8 mm diameter foam disks, using 467MP Laminating Adhesive (available from 3M, St. Paul, Minn.) to obtain a minimum sample thickness of 8 mm.

Measurements were made of the Force vs. Displacement response of the various foams after applying a constant static pre-load of 100 g to the sample. Measurements were taken under dynamic conditions by operating the instrument in the "Dynamic Strain Frequency Sweep Mode." The software calculated the values of E' based on the input data. In the static compression tests, the reported average value of E' was calculated from the slope of the line in the linear portion of the response curve by averaging the values of the first 10 data points recorded by the instrument.

Batch Processing

The examples below were prepared in a 50 mL stainless steel view cell equipped with sapphire windows, a magnetic stirrer and, optionally, an additional pressure handling system to add various materials under high pressure. The cell was heated externally by an electrical element. The temperature was monitored by a thermocouple connected to a temperature controller.

Example 1

Epoxy—Polypropylene Films

Six samples of polypropylene film (DS7C50 polypropylene, Union Carbide Corp., Danbury, Conn.), each measuring 0.6 cm×15 cm×0.25 mm, weighing a total of 1.242 g, were placed in a 50 mL reaction vessel with 0.52 g 3,4-epoxycyclohexylmethyl-3,4-epoxy cyclohexanecarboxylate (ERL 4221, Union Carbide Corp., Danbury, Conn.) and 2 wt. % $Ar_3SSbF_6$ photoinitiator (prepared as described in U.S. Pat. No. 4,173,476, Example 1), based upon the weight of ERL 4221. The vessel was sealed and filled with carbon dioxide, after which the samples were equilibrated at 155° C. and 260 kg/cm$^2$ (3700 psig) for one hour. The vessel was then cooled to 50° C. over a 10 minute period, with an accompanying reduction in pressure, then held at 50° C. for 30 minutes. Finally, the vessel was cooled to 41° C., causing the pressure to be reduced to 204 kg/cm$^2$ (2900 psig). After the carbon dioxide was vented, the samples remained at 23° C. for 12 hours, then were recovered from the vessel as a single opaque fused strip, weighing 1.52 g.

Example 2

Epoxy—Polypropylene Films

Six samples of polypropylene film were treated as described in Example 1, except that, by maintaining the reaction vessel at 140° C., the strips did not fuse. After one hour at this temperature, the vessel was cooled to 40° C., which caused reduction of pressure to 204 kg/cm$^2$ (2900 psig). The samples were held at these conditions for approximately 20 minutes. After venting the vessel, the six opaque white strips were removed and wiped free of excess epoxy resin with a clean nonwoven cloth (KIMWIPES, Kimberly Clark Corp., Roswell, Ga.). The strips were then placed under two BL350 ultraviolet light curing bulbs (Osram Sylvania, Inc., Danvers, Mass.) and subjected to an irradiation at 2.5 cm from the sample for 5 minutes, to produce a dose of 1.5 mJ/cm$^2$.

Dynamic mechanical properties of the cured strips were measured using a Seiko Instruments DMA 200 Rheometer (Seiko Instruments, Torrance, Calif.) equipped with a tensile sample fixture. The samples were tested from −60 to 200° C. at 2° C./minute and 1 Hz. Separation between the jaws was 20 mm. The tensile storage modulus of the cured materials was shown to be greater than that of the starting polypropylene strips. Tensile modulus testing was performed on four samples made with the same polypropylene material: (1) a cured foam of the present invention, (2) an uncured foam of the present invention, (3) an irradiated thermoplastic foam containing no thermoset material, and (4) (control sample) an irradiated unfoamed polymer film containing no thermoset. The data showed that the cured foam and the control film had comparable tensile moduli. This demonstrates that the present invention can provide materials as strong as a polymer film, but having a lower density. The data further showed that the cured foam of the invention and control film had a higher tensile modulus than the uncured foam of the invention (about two times higher at 23° C., with greater differences at temperatures up to about 160° C.). This demonstrates that the polymeric material can be plasticized pursuant to the present invention so that it is easier to process, but then can be cured for use such that it is as strong as an unfoamed film. The data also showed that the cured foam of the present invention had a higher tensile modulus than a cured foam containing no thermoset material (about one time higher at 23° C., with greater differences at temperatures up to about 160° C.).

Figure 2:
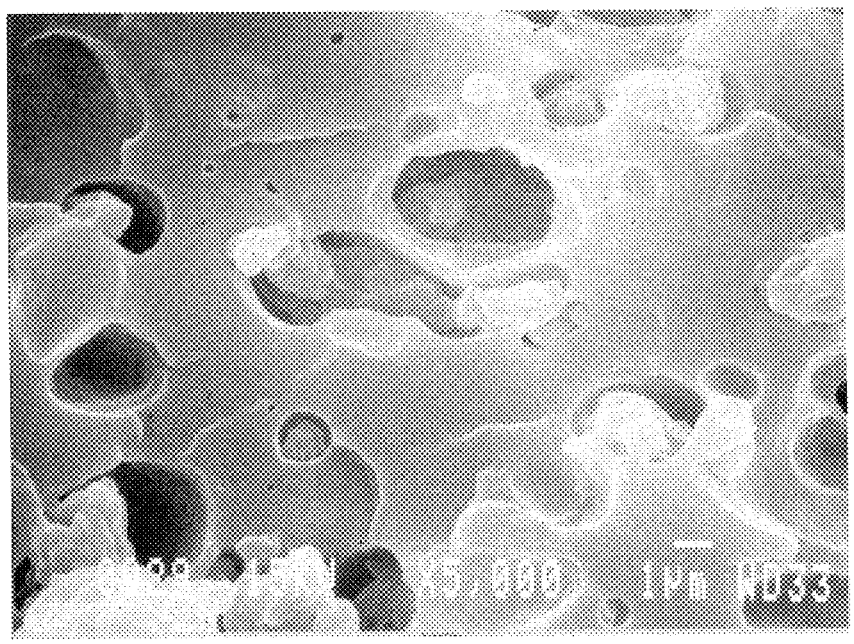

FIGS. 1 and 2 are SEM micrographs of the cured foam (Sample (1)) of this example. The lighter-colored lumps inside the voids are epoxy and the lighter-colored regions in the matrix are small epoxy domains.

Example 3

Chemical Blowing Agent

A mixture of low density polyethylene thermoplastic (LDPE, TENITE 1550P, Eastman Chemical Co., Kingsport, Tenn.) and cycloaliphatic epoxy resin (ERL-4221, Union Carbide Corp., Danbury, Conn.) was prepared by heating and stirring 90 parts by weight of LDPE in a Brabender PLASTICORD Model EPL-V5501 counterrotating mixer (C. W. Brabender Instruments, Inc., South Hackensack, N.J.) at 60 rpm for five minutes at 175° C., then adding 10 parts by weight of epoxide with continued stirring and heating for five minutes. The mixer was open to atmospheric pressure. A thermal blowing agent, p,p'-oxybis(benzenesulfonyl hydrazine) (OBSH, CELOGEN OT, Uniroyal Chemical Co., Inc., Middlebury, Conn.), at 5 wt %, based on total weight of polyethylene plus epoxide, was added and the mixture was removed after an additional one minute of stirring and heating. A portion of the mixture was placed in a Model 2759-248 hydraulic press (Carver Inc., Wabash, Ind.) and the material was allowed to foam and expand through the gap around the edges of the press plates. The resulting foam material was approximately 1 mm thick and exhibited a density between 288 and 720 kg/m$^3$ as determined by Method 1.

Continuous Processing

Example 4

Physical Blowing Agent

Foamed materials were prepared by extrusion of mixtures containing carbon dioxide, in a conical twin screw extruder having a front diameter of 20 mm and a rear diameter of 31.8 mm, with an effective cylinder length of 300 mm, equipped with intensive mixing screws and having 4 heating zones (Model Rheomex TW100, with mixing screw model #557-2212, Haake, Inc., Paramus, N.J.). The temperatures of zones 1 to 4 were approximately 380° C., 395° C., 400° C., and 400° C. An intermeshing counter rotating screw alignment was used. Screw speed was set at 100 rpm. Thermoplastic pellets comprising a high density polyethylene (HDPE 25455, Dow Chemical Company, Midland, Mich.) were fed into zone 1 of the extruder at a rate of about 60 grams per minute. At zone 2 liquid $CO_2$ was injected from a cylinder (with a gauge pressure of 5516 kPa (800 psi)) via a metering piston pump with a dual head (Model AA-100-S, Eldex Laboratories, Inc., Napa, Calif.). Care was taken to form a melt seal between the pellet feed port and the gas inlet. A catalyst comprising triaryl sulfonium antimonate powder R-23164 was predissolved in an aromatic epoxy available as EPON 828 from Shell Chemical Company, Houston, Tex., (at a concentration of 2% by weight of the epoxy) in a stirred kettle at 80° C. for fifteen minutes. The epoxy/catalyst mixture was injected as a liquid, downstream of the gas inlet, with a Zenith pump (Model HPB 4740, Parker Hannifm Corporation, Stanford, Conn.) at a setting of 4 rpm, providing an epoxy concentration of approximately 1.3 weight percent. The operating pressure in the extruder and die was approximately 21 kg/cm$^2$(300 psi). The mixture was extruded through the die onto a cast wheel. The mixture foamed as it was exposed to ambient pressure and temperature. The cast wheel was maintained at 75° C., which was part of a Univex take off unit (Model SFR100, option C, C. W. Brabender Instruments Incorporated, South Hackensack, N.J.) used to collect the foamed film. The take off unit comprised chrome plate stainless steel rolls cored for liquid heating or cooling, with adjustable gap and tension. Model option C was suitable for low rpm-high torque conditions (0.25 to 13 rpm). After being extruded, and after the foams were fully formed, i e., cell growth had ceased, the thermoset material in the foams was cured. Ultraviolet curing was done using two BL350 bulbs, (Osram Sylvania, Inc., Danvers, Mass.). The total radiation dosage per side of the extruded samples was 1.5 Joules per square centimeter. The samples were then placed in an oven for 30 minutes at 75° C. to finish the cure. The samples were 0.53 to 0.58 mm thick.

Figure 3:
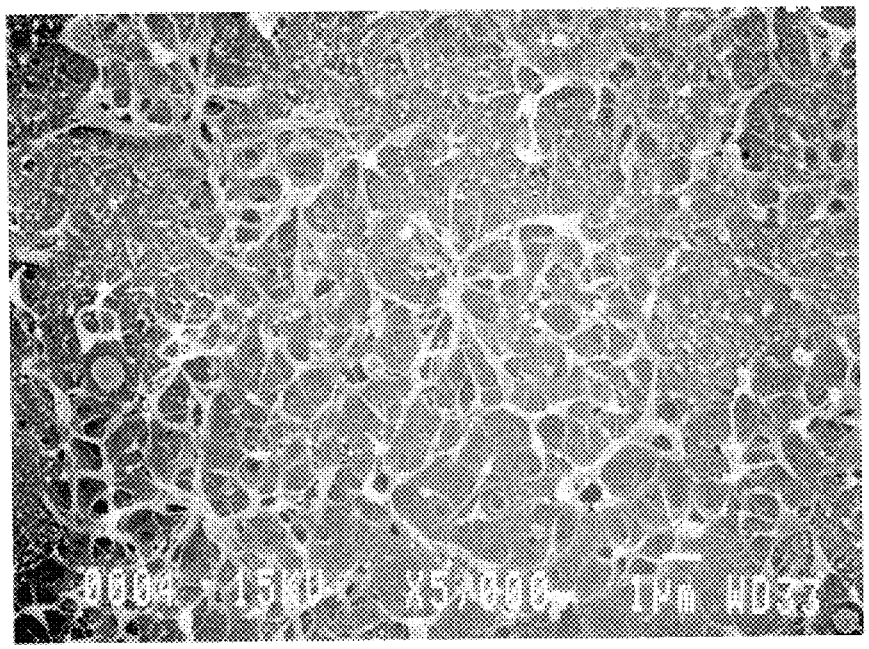
FIG. 3 shows a scanning electron microscope (SEM) digital image micrograph of a cross section of a cured polyethylene/aromatic epoxy film, made by a continuous process of the present invention, at a magnification of 5,000×.

FIG. 3 shows an SEM of a foam made by this method. The light-colored dots (about 0.1 $\mu$m diameter) are epoxy entrained in the thermoplastic material. It can also be seen that some of the cell voids are slightly coated with epoxy. The light-colored interconnected web-like structure is part of the epoxy-rich thermoplastic matrix material.

Example 5

Physical Blowing Agent

Foamed materials were prepared by extrusion of mixtures containing carbon dioxide, in a 30 mm diameter twin screw extruder with a 37:1 length to diameter ratio equipped with co-rotating screws and 12 heating zones (Model ZSK-30, Werner & Pfleiderer Corp., Ramsey, N.J.). The temperature profile of the extruder was: zone 1, 149° C.; and zones 3–12, 177° C. The die temperature was approximately 191° C. A high-intensity mixing screw configuration was used, comprising forward kneading blocks in zones 2, 4, 6, and 8, with forward conveying elements in the remaining zones. Screw speed was set at 222 rpm. Thermoplastic pellets were fed into zone 1 using a K-tron screw feeder (K-Tron America, Pitman, N.J.) at a rate of approximately 75.6 g/min. $CO_2$ was metered into zone 5 at approximately 8.5 g/min in order to aid plastification of the thermoplastic material before introduction of epoxy, and epoxy was metered into zone 7 using a Zenith pump (Parker Hannifin Corp., Sanford, N.C.) at a pressure of 136 kg/cm$^2$ (1947 psig). The operating pressure in the extruder was 168 kg/cm$^2$ (2405 psig). A second Zenith melt pump maintained constant 4.5 kg/hr flow of the melt mixture to a 15-cm wide film die, which was connected to the extruder by a 1.2 m neck tube. The material foamed as it exited the die and was exposed to ambient pressure and temperature. The material exiting the die was cast onto a nickel-chrome plasma-etched stainless steel casting cylinder rotating at a rate equal to the output rate of the extruded web. Material thickness was approximately 0.82 to 1.03 mm and was maintained by passing the foam material into a gap or "nip" of 6 mm between the casting cylinder and a silicon-rubber nipping roll.

Foams of this Example comprised cycloaliphatic epoxy (ERL-4221, Union Carbide Corp., Danbury, Conn.) with 2 wt %, based upon epoxy, of $Ar_3SSbF_6$ photoinitiator (3M, St. Paul, Minn.) and TENITE 1550 polypropylene (Eastman Chemical Co., Kingspot, Tenn.). The weight % epoxy is based upon the total weight of epoxy plus polypropylene. Foamed materials were photocured using a Model 250 Flexo Exposure Unit (Kelleigh Corp., Middlesex, N.J.) with a maximum output energy of 80 mW/cm² at a wavelength of 370 nm and exposure time of 15 minutes. Samples were then thermally postcured at 80° C. for one hour. Properties of cured foams containing varying amounts of epoxy resin are shown in Table 1. Density of the foam samples was determined by Method 2.

TABLE 1

| Nominal wt. % epoxy | Density (Kg/m³) | Compression Modulus (10⁵ Pa) | |
|---|---|---|---|
| | | Uncured | Cured |
| 0 | 530 | | NA |
| 5 | 547 | 4.21 | 5.28 |
| 10 | 650 | 8.18 | 12.6 |
| 15 | 704 | 14.2 | 13.8 |
| 18 | 715 | 14.5 | 14.0 |
| 18* | 515 | 12.4 | 23.3 |

*Nip roll gap set at 1.0 mm

The data of Table 1 show that curing the thermoset component of the hybrid foam material can increase the compressive modulus of the foam. The data in Table 1 indicate that as the epoxy weight % is increased, the compression modulus of the cured and uncured foam material increased. In addition, the compression modulus for a cured foam material increased relative to its uncured compression modulus, until an epoxy weight % was reached at which the compression moduli of the uncured and cured material remained about equal. This was likely due to the distribution of the thermoset material in the thermoplastic matrix, the degree of compatibility of the two components, and the cell size of the foam. The distribution of epoxy resin in the foam was also affected by the solubility profile of the resin in supercritical $CO_2$. Development of foam properties is also dependent upon the foaming process, as was shown by the difference in properties between the two foams in the table comprising 18 wt % epoxy resin, where the only difference in the process was the nip roll gap after the material exited the die.

Example 6

Chemical Blowing Agent

Low density polyethylene thermoplastic (LDPE, TENITE 1550P) and 15% by weight (based on the total weight of polyethylene plus epoxide) of a modified azodicarbamide chemical blowing agent (CELOGEN 754, Uniroyal Chemical Co., Inc., Middlebury, Conn.) were mixed prior to addition to an extruder. A mixture of cycloaliphatic epoxy resin (ERL-4221) and 1% by weight, based upon weight of epoxy, of cationic photoinitiator ($Ar_3SSbF_6$) was pumped into the extruder using a Zenith pump at a port downstream from the port introducing the thermoplastic.

Foamed films were extruded generally as described in Example 5, at a thickness of 0.25 mm except the operating pressure of the extruder barrel was 42 kg/cm² (605 psig); the temperature profile of the extruder was: zone 1, 138° C.; zone 3, 143° C.; zone 5, 138° C.; zone 7, 127° C.; zone 9, 116° C.; and zone 11, 104° C. The foamed materials were photocured using a Model 250 Flexo Exposure Unit (Kelleigh Corp., Middlesex, N.J.), as described in Example 5. Uncured and cured foams exhibited properties shown in Table 2.

TABLE 2

| Nominal wt. % epoxy | Density (Kg/m³) | Compression Modulus (10⁵ Pa) | |
|---|---|---|---|
| | | Uncured | Cured |
| 0 | 352 | 1.23 | NA |
| 15 | 608 | 6.72 | 5.67 |

Table 2 shows that the introduction of low viscosity epoxy resin into the system using the azodicarbamide blowing agent resulted in the formation of a denser foam. Cure of the foam resulted in a slight decrease in modulus when measured under the conditions described in Example 5.

Example 7

Multilayer Foam Constructions

Multilayer foam constructions were prepared generally as described in Example 5, except that a three layer extrusion die (available from the Cloeren Co., Orange, Tex.) was used to extrude non-foamed surface layers of varying compositions on a foamed core. The extruder operating pressure was approximately 78 kg/cm² (1110 psig). The extruder temperature profile was zone 1, 121° C.; zone 3, 149° C., and zones 5 to 12, 177° C. The twin-screw extruder described in Example 5 was used to feed the center orifice of the die. Pelletized thermoplastic resins were fed into the top and bottom orifices of the three-layer die via a pair of single screw extruders (Killion Extruders, Cedar Grove, N.J.). If the outer layer materials were not solid when fed into the extruder, the single screw extruders were fed using an additional screw feeder (Bonnot Company, Uniontown, Ohio). Composition and density of the resulting composite foamed materials are shown in Table 3. The top and bottom layers of the multilayer construction were each about 0.037 mm thick. The thickness of the middle layer ranged from about 1.1 to 2.1 mm. The samples were cured according to the method described in Example 5. In the Table:

All formulations contain ERL-4221 epoxy with 2 weight % (based on epoxy resin) $Ar_3SSbF_6$ photoinitiator;

PE=TENITE 1550P LDPE;

EVA=ELVAX 260 ethylene-vinyl acetate (DuPont Chemical Co., Wilmington, Del.);

C8=poly(octene) (3M, St. Paul, Minn.);

FC430=nonionic fluoroaliphatic polymeric esters (3M, St. Paul, Minn.), a compatibilizing agent Poly THF 250=polytetramethylene ether glycol in the molecular weight range of about 200 to 4000 (BASF, Parsippany, N.J.), a compatibilizing agent

TABLE 3

| Layer Construction | | | | Density (Kg/m³) | Compression Modulus (10⁶ Pa) | |
|---|---|---|---|---|---|---|
| Top | Nominal Epoxy wt % | Middle Thermoplastic | Bottom | | No Cure | Cured |
| PE | 0 | PE | PE | 638 | | NA |
| PE | 5 | PE | PE | 627 | | |
| PE | 15 | PE | PE | — | | |

TABLE 3-continued

| | Layer Construction Middle | | | | Compression Modulus (10^6 Pa) | |
|---|---|---|---|---|---|---|
| Top | Nominal Epoxy wt % | Thermoplastic | Bottom | Density (Kg/m³) | No Cure | Cured |
| PE | 20 | PE | PE | 779 | 12.8 | 15.5 |
| PE | 20 | PE | PE | 755 | | |
| PE | 20 | PE | PE | 826 | 12.7 | 9.28 |
| PE | 30 | PE | PE | 819 | | |
| PE | 20 | PE | EVA | 853 | 19.9 | 13.7 |
| PE | 10 | PE + 3 wt % FC430 | EVA | 782 | | |
| PE | 20 | PE + 3 wt % FC430 | EVA | 826 | 0.89 | 2.86 |
| PE | 20 | 90/10 PE/EVA +3 wt % FC430 | EVA | 827 | 0.95 | 1.29 |
| PE | 10 | 90/10 PE/EVA | C8 | 738 | 13.4 | 20.2 |
| PE | 20 | 90/10 PE/EVA | C8 | 834 | | |
| EVA | 10 | 90/10 PE/EVA +30 wt % THF 250 | EVA | 786 | 1.14 | 3.63 |
| EVA | 20 | 90/10 PE/EVA +30 wt % THF 250 | EVA | 682 | 12.1 | 48.1 |

Measurement of force vs. deflection for cured and uncured multilayer foam materials was carried out by laminating single 8 mm diameter punched disks of foam samples together to form stacks at least 8 mm in height. Selected uncured foams and foams cured and tested as described in Example 5 exhibited the properties shown in Table 3. Not all samples listed in Table 3 were tested for compression modulus.

Comparison of data in Table 1 and Table 3 shows that higher density foams were obtained using multilayer constructions than with single layer constructions. The use of compatibilizing agents in the thermoset/thermoplastic foams enhances the effect of the thermoset cure on the compression modulus.

Example 8

Flexographic Print Quality Evaluation

The effect of the foam's variable modulus properties on flexographic print quality were evaluated by their use as mounting materials under flexographic plates in a print trial. Polyethylene-epoxy foam (18* wt % epoxy, from Example 5, Table 1) was solvent-wiped with methyl ethyl ketone to remove traces of liquid epoxy resin from the surface, then ground to a uniform caliper of 0.46 mm. This foam was then cured according to the method of Example 5, except that the exposure time was 12 minutes and no thermal postcure was used. The image on the foam was made by superimposing a photographic negative on top of the foam and irradiating through the negative. The negative incorporated a variety of test patterns that are commonly used in the flexographic printing industry to assess print quality. These features included distinct areas of solid and half-tone printing. Reference marks were made on the foam material at the time of imaging to indicate the orientation of the negative, since no visible image appeared on the foam after irradiation. The same negative was used to image the photopolymer printing plates that were used in the print trials.

The printing plates used were CYREL EXL photopolymer plates (available from E.I. DuPont de Nemours and Co., Wilmington, Del.) which were imaged and developed according to manufacturer's instructions. The plates were 1.7 mm thick.

Acrylate transfer tape (Cat. No 465 adhesive, available from 3M, St. Paul, Minn.) of nominal thickness of 0.05 mm was adhered to each face of the ground foam to give a double-sided tape of nominal thickness of 0.56 mm. This imaged tape was used to mount the photopolymer plate bearing the corresponding image, such that the cured areas of the plate corresponded to the solid color portions of the test images. An uncured, unimaged control sample of the same 18* wt % epoxy foam material was mounted under a second printing plate bearing the same pattern. Two conventional, fixed modulus thermoplastic foam flexographic mounting tapes and a solid vinyl tape (CUSHION MOUNT 1020 and 1120 and 412DL solid vinyl tape available from 3M, St. Paul, Minn.) were also used on-press for comparison with test plates bearing the same test patterns. Dynamic compression modulus measurements were made from the print test substrates, using the RSA II. The results are shown in Table 4.

TABLE 4

| Frequency (Hz) | Uncured 18 wt % Epoxy (10^5 Pa) | Cured 18 wt % Epoxy (10^5 Pa) | 1020 Tape (10^5 Pa) | 1120 Tape (10^5 Pa) |
|---|---|---|---|---|
| 0.1 | 7.12 | 25.6 | 7.96 | 4.73 |
| 0.15849 | 7.50 | 26.6 | 8.68 | 4.53 |
| 0.25119 | 7.90 | 27.7 | 8.79 | 4.47 |
| 0.3981 | 8.23 | 28.5 | 8.96 | 4.58 |
| 0.63095 | 8.91 | 29.7 | 9.49 | 4.76 |
| 0.99998 | 9.67 | 30.9 | 9.78 | 4.94 |
| 1.58487 | 10.5 | 32.1 | 10.1 | 5.13 |
| 2.51186 | 11.4 | 33.3 | 10.5 | 5.31 |
| 3.98105 | 12.4 | 34.8 | 10.8 | 5.53 |
| 6.30962 | 13.6 | 35.9 | 11.2 | 5.68 |
| 10.0002 | 14.9 | 37.4 | 11.6 | 5.99 |
| 15.9 | 16.4 | 38.8 | 12.2 | 6.23 |

These dynamic measurements showed that the cured 18 wt % epoxy foam material of the invention was significantly stiffer than the uncured material and the two commercial thermoplastic foam tapes, and would be expected to print better solid images when cured than the thermoplastic foams. Additionally, the uncured material is close in modulus value to CUSHION MOUNT 1020 tape, so that good half-tone images should be obtainable in areas where the foam is left uncured.

The plate and tape combinations were used to print test images on white polyethylene film that was corona-treated in-line to a surface energy of 41–42 dynes/cm². Water-based magenta flexographic ink, WBJ-26865 AQUAZELL Process Red (available from Progressive Ink Co., Neenah, Wis.), was used for all tests. A Carint Model S12 wide-web central impression flexographic press, manufactured by Carraro Graphic Equipment, Inc., Milan, Italy, was used to prepare all print samples.

An evaluation of the print quality of imaged variable modulus foam was done through measurement of solid ink density (SID) in the solid-color printed areas of the test image. SID was measured using a Gretag D186 densitometer (available from Gretag AG, Zurich, Switzerland) calibrated for magenta ink according to the manufacturer's instructions. SID values were read at the same three points on ten samples of each printing condition in order to establish an average value. SID was measured over a speed range of 122, 183, and 244 m/min and at three different levels of impression on the press ("Kiss" (ie., lowest level of impression which gives a complete image of the plate), 0.05 mm, and 0.1 mm).

Typical soft mounting foams showed a low initial value of SID, and a loss of SID with increasing press speed due to the damping effect of the foam. Harder foam tapes gave a higher SID value and showed less effect of press speed on SID. Solid vinyl tapes gave the highest SID values and showed essentially no effect of press speed. A desirable thermoplastic/thermoset foam mounting tape can be optimized for combination printing to display foam-like behavior in the uncured state but behave more like a solid tape in the cured (imaged) state. Table 5 displays measured SID data from the print trial run, at the "Kiss" impression level.

TABLE 5

| Sample Mounting Tape | Press Speed (m/sec) | | |
|---|---|---|---|
| | 122 | 183 SID | 244 |
| 412DL comparative | 1.34 | 1.38 | 1.36 |
| 1020 comparative | 1.26 | NT | 1.06 |
| 1120 comparative | 1.14 | NT | 0.86 |
| Unimaged 18% epoxy | 1.28 | 1.28 | 1.23 |
| Imaged 18% epoxy | 1.38 | 1.40 | 1.42 |

These results show both that the absolute value of the solid ink density in the tested print areas increased when the thermoset portion of the experimental foams was cured, and that the tendency of the SID values to decrease with increasing press speed was reversed when the thermoset portion of the foam was cured. The results show that the hybrid foams of the invention had the ability to provide a unique variable modulus property that can be advantageous for flexographic printing.

Other embodiments of the invention are within the scope of the following claims.

What is claimed is:

1. A material comprising a foam comprising a discontinuous phase of at least one cationically-curable thermoset material in a continuous phase of at least one thermoplastic material, and at least one unactivated radiation-activatable curing agent for the thermoset material.

2. The material of claim 1 wherein the material is a flexographic mounting material.

3. The material of claim 1 having a multiplicity of foam cells containing thermoset material.

4. The material of claim 1 wherein the thermoset material comprises about 1 to 45 weight % of the combined weight of the thermoplastic and thermoset materials.

5. The material of claim 1 wherein the thermoset material is selected from the group consisting of epoxy-containing materials, cyanate esters, alkyl vinyl ethers, cyclic ethers, styrene, divinyl benzene, vinyl toluene, N-vinyl compounds, 1-alkyl olefins (alpha olefins), lactams, ring-strained dienes, and cyclic acetals.

6. The material of claim 1 wherein the thermoset material is an epoxy-containing material.

7. The material of claim 1 wherein the thermoset material is microencapsulated in the thermoplastic matrix material.

8. An article comprising the foam material of claim 1.

9. The article of claim 8 wherein at least a portion of at least one surface is covered by a coating.

10. The article of claim 9 wherein the coating comprises a pressure sensitive adhesive.

11. A flexographic printing plate comprising the foam of claim 1.

12. A flexographic mounting tape comprising the foam of claim 1.

13. A material comprising a foam comprising a discontinuous phase of at least one cationically-curable thermoset material in a continuous phase of at least one thermoplastic material, wherein the thermoset material is selectively cured after the foam is formed.

14. A foamable composition comprising a discontinuous phase of 10 to 25 weight % of at least one cationically-curable thermoset material in a continuous phase of at least one thermoplastic material, at least one blowing agent, and at least one unactivated radiation-activatable curing agent for the thermoset material.

15. A foamable composition comprising a discontinuous phase of at least one cationically-curable thermoset material in a continuous phase of at least one thermoplastic material, at least one blowing agent, and at least one light activatable curing agent for the thermoset material.

16. A method for making a hybrid thermoplastic/thermoset foam comprising:

mixing at least one thermoplastic material with at least one cationically curable thermoset material and at least one blowing agent at a temperature and pressure sufficient to form and maintain a uniformly dispersed mixture such that the thermoset forms a discontinuous phase in a continuous thermoplastic phase, shaping the mixture, and exposing the mixture to a reduced pressure to cause nucleation and cell formation;

wherein said at least one thermoset material remains substantially uncured.

17. The method of claim 16 wherein the mixture further comprises at least one activatable curing agent for the thermoset material.

18. The method of claim 16 wherein the mixture further comprises an additive selected from the group consisting of surfactants and compatibilizers.

19. The method of claim 16 wherein thermoset material is present in a mutiplicity of cells of the resulting foam.

20. The method of claim 19 wherein the cells collapse after foaming, thereby microencapsulating thermoset material in thermoplastic material.

21. The method of claim 16 wherein the thermoset material comprises about 1 to 45 weight % of the melt solution.

22. The method of claim 16 wherein the blowing agent is a physical blowing agent.

23. The method of claim 16 wherein the blowing agent is carbon dioxide.

24. The method of claim 16 further comprising the step of at least partially curing the thermoset material.

25. The method of claim 16 further comprising the step of selectively curing the thermoset material after the foam is formed.

26. The method of claim 16 wherein the foam is produced continuously in an extruder.

27. The method of claim 16 wherein the foam material is incorporated into a multi-layer structure.

28. The method of claim 27 wherein the foam material is incorporated by coextrusion or post-extrusion processing.

29. The method of claim 16 wherein the thermoset monomer is selected from the group consisting of epoxy-containing materials, cyanate esters, alkyl vinyl ethers, cyclic ethers, styrene, divinyl benzene, vinyl toluene, N-vinyl compounds, 1-alkyl olefins (alpha olefins), lactams, ring-strained dienes, and cyclic acetals.

30. The method of claim 16 wherein the thermoplastic material is selected from the group consisting of polyesters, polyamides, polyurethanes, fluoropolymers, and polyolefins.

* * * * *

UNITED STATES PATENT AND TRADEMARK OFFICE
CERTIFICATE OF CORRECTION

PATENT NO. : 6,323,251 B1
DATED : November 27, 2001
INVENTOR(S) : Perez, Mario A.

It is certified that error appears in the above-identified patent and that said Letters Patent is hereby corrected as shown below:

<u>Title page,</u>
Item [73], Assignee: 3M Innovative Properties Company, St. Paul, MN (US).

<u>Column 6,</u>
Line 57, "mechanisms" should read -- mechanism --.

<u>Column 7,</u>
Line 1, "retrieve d" should read -- retrieved --.

<u>Column 12,</u>
Line 6, "representatives" should read -- representative --.

<u>Column 13,</u>
Line 25, "$Q(OCN)_p$" should read -- $Q(OCN)_p$ I --.

<u>Column 14,</u>
Line 57, delete "tris(4-cyanatophenyl)phosphate,".

<u>Column 17,</u>
Line 54, "SbF6⁻" should read -- $SbF_6^-$ --.

<u>Column 18,</u>
Line 30, "such acetyl" should read -- such as acetyl --.

<u>Column 21,</u>
Line 6, "layers of that" should read -- layers that --.

<u>Column 24,</u>
Line 3, "Hannifm" should read -- Hannifin --.

UNITED STATES PATENT AND TRADEMARK OFFICE
CERTIFICATE OF CORRECTION

PATENT NO.    : 6,323,251 B1
DATED         : November 27, 2001
INVENTOR(S)   : Perez, Mario A.

It is certified that error appears in the above-identified patent and that said Letters Patent is hereby corrected as shown below:

<u>Column 30,</u>
Line 57, "monomer" should read -- material --.

Signed and Sealed this

Thirtieth Day of July, 2002

*Attest:*

*Attesting Officer*

JAMES E. ROGAN
*Director of the United States Patent and Trademark Office*